Oct. 1, 1929.    L. J. BROWN    1,730,264

PIPE HANGER ANCHOR AND THE LIKE

Filed April 1, 1929    2 Sheets-Sheet 1

Inventor:
Lloyd J. Brown
By Thos. A. Banning Jr.
Atty.

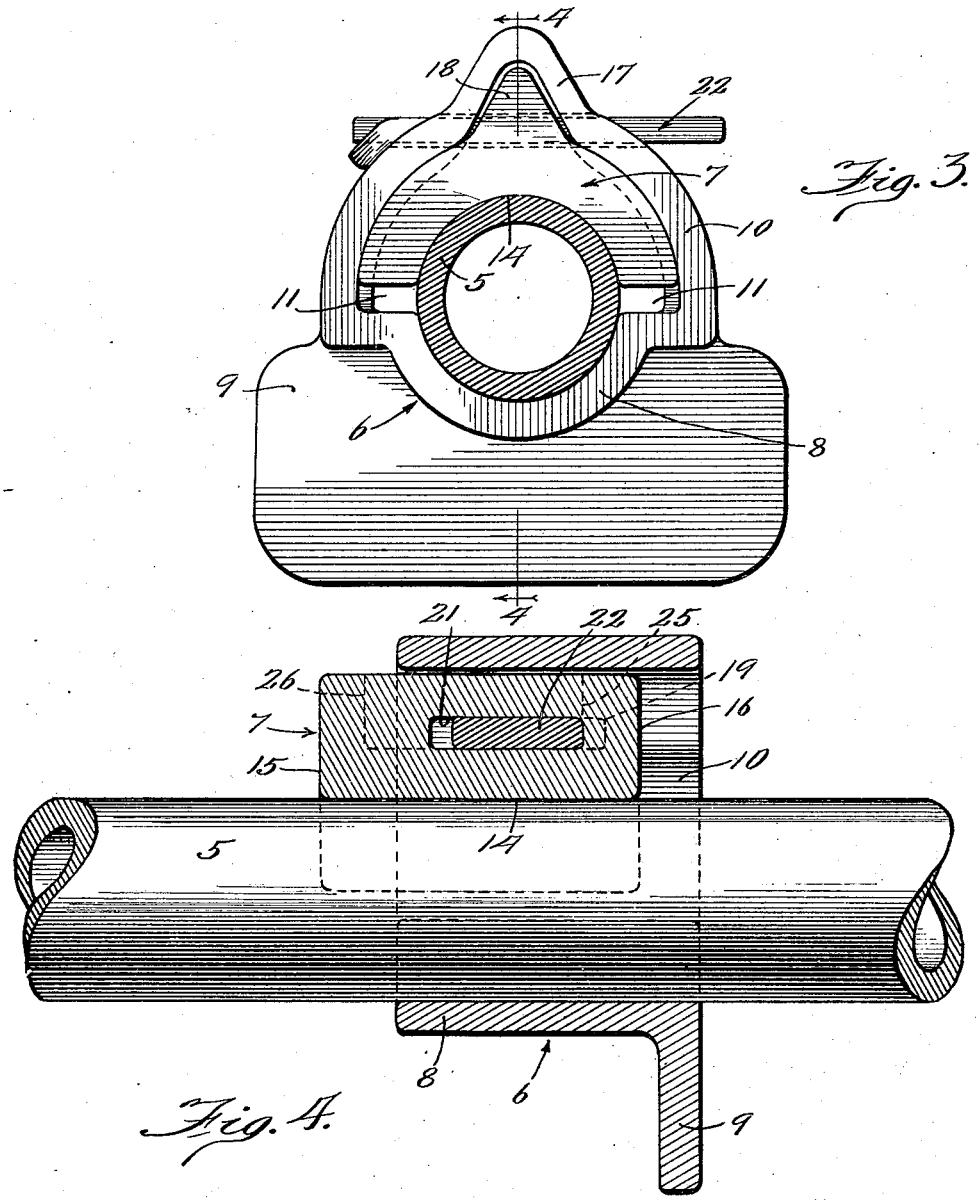

Patented Oct. 1, 1929

1,730,264

UNITED STATES PATENT OFFICE

LLOYD J. BROWN, OF CHICAGO, ILLINOIS

PIPE-HANGER ANCHOR AND THE LIKE

Application filed April 1, 1929. Serial No. 351,558.

This invention has to do with improvements in pipe hanger anchors and the like. The invention relates particularly to devices of this class which are adapted for use in supporting and anchoring train line pipes and the heating pipes which extend lengthwise of cars and the like, but it will presently appear that the features of the invention are not limited to this or any other class of service.

One of the objects of the invention is to provide a pipe hanger anchor which is so constructed that it will grip and anchor the pipe in a very solid manner so that the longitudinal shifting of the pipe is practically prevented. Another object in this connection is to provide a device of such construction that the pipe will be gripped without damage or injury to the pipe, such result being obtained by a construction which grips the pipe around practically its entire circumference.

Another object of the invention is to provide a new and improved locking means for locking the parts at wedging engagement with each other.

In this connection it is an object to entirely eliminate the use of any bolts or nuts or similar devices, use being made of a wedge block which operates in a very efficient manner to perform its function.

A further object in connection with the foregoing is to provide an arrangement such that the wedge block will not only serve to lock the parts together, but will also serve as an efficient wedging instrumentality for bringing the parts into wedging engagement in the first place. That is to say, the wedge block performs the two functions of first bringing the parts into wedging engagement and secondly retaining or locking them in such engagement.

A further feature of the invention relates to a device of very simple form and construction and at the same time one which is extremely rugged and durable and well adapted to perform its functions.

Other objects and uses of the invention will appear from a detailed description of the same which consists in the features of construction and combinations of parts hereinafter described and claimed.

Figure 1:
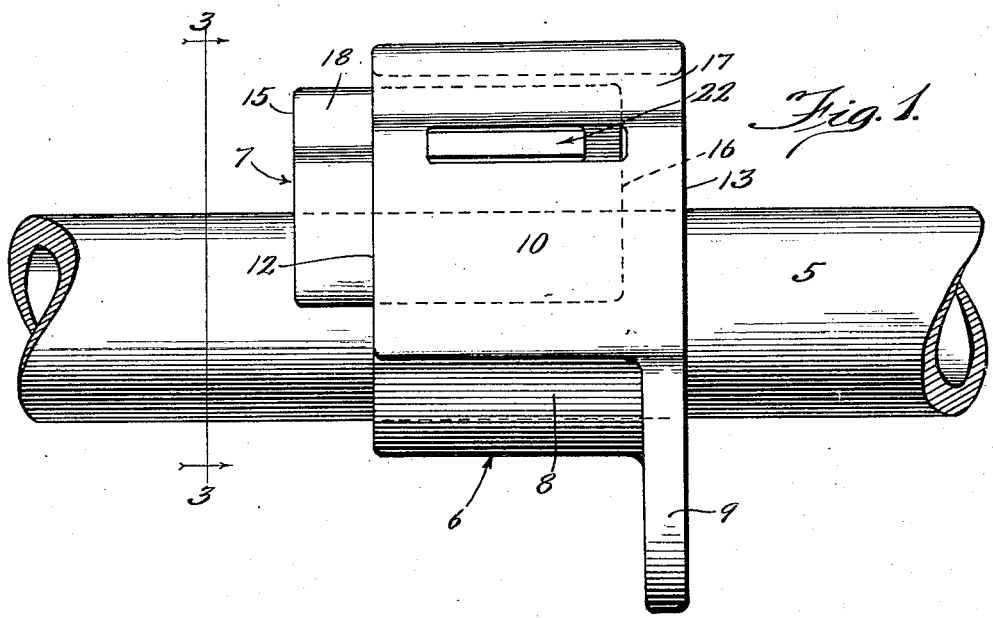
Figure 1 shows a side elevation of a device embodying the features of the present invention as the same is applied to a pipe section.
Figure 2:
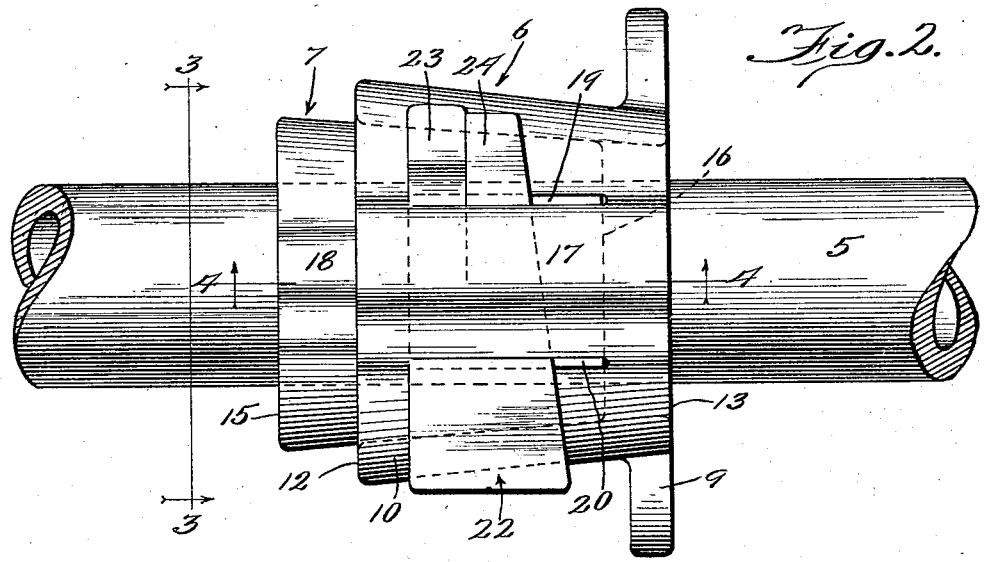
Figure 2 shows a top view corresponding to Figure 1.

Figure 3 shows an end view corresponding to Figures 1 and 2, being taken on the lines 3—3 of Figures 1 and 2 looking in the direction of the arrows; and Figure 4 shows a longitudinal section on the lines 4—4 of Figures 2 and 3 looking in the direction of the arrows.

In the drawings I have illustrated a device embodying my present invention as the same is applied to a pipe section 5. The present device includes a member 6 which may be termed the body member, together with another member 7 which may be termed the wedge member. The body member 6 is provided with a curved portion 8 which is practically semi-cylindrical in form and extends length-wise a sufficient distance to give the desired amount of support for the pipe 5. At one end of the portion 8 the member 6 is provided with a lug 9 for attachment to the frame or bracket of the car.

The member 6 is provided with an enlarged extension 10 which reaches upwardly from the semi-cylindrical portion 8 but is of larger size so as to establish a longitudinally extending passage 11 which is semi-cylindrical in form and reaches up and over the pipe 5 and extends practically the full length of the pipe clamp.

The portion 10 tapers in size from the front end 12 to the rear end 13 so that the passage 11 is of tapering size. This fact is clearly shown in Figures 2 and 3.

The wedge block 7 has its under or interior face 14 practically semi-cylindrical in form so as to lie evenly on the pipe 5. The outer face of this wedge member 7 tapers in size from its front end 15 to its rear end 16, such taper corresponding to the taper of the passage 11. The result is that by driving the wedge member 7 home into the passage 11 said wedge member will be very firmly wedged against the surface of the pipe so that the pipe will be firmly clamped between members 6 and 7.

The portion 10 of the member 6 is provided with an upwardly extending channel 17; and the wedge member 7 is provided with an upwardly extending ridge 18 which works in the channel 17 but preferably does not contact directly against said channel. This member 18 will serve to keep the wedge member 7 properly aligned and centralized within the passage 10 so that said member 7 will not be allowed to work over to one side or the other.

The channel 17 is provided with the oppositely disposed side slots 19 and 20 (best shown in Figs. 1 and 2) and the extension 18 of the wedge member is provided with a companion opening 21 which registers with the slots 19 and 20. A key block 22 is set through the slots 19 and 20 and through the companion opening 21 as best indicated in Figure 2. This key block 22 is of wedge form so that when it is driven into place it bears against the slots 19 and 20 at one end and it bears against the opening 21 of the wedge block 7 at the other end. Consequently said key block 22 will tend to draw the wedge block 7 more firmly into wedging engagement with the pipe and will also prevent disengagement of the wedge block 7 from the member 6.

Ordinarily the locking function is performed by driving the wedge member 7 home by striking its end 15 with a hammer. Thereafter the wedge block 22 will be driven firmly into place by striking its larger end with a hammer.

The smaller end of the wedge block 22 is preferably split as shown at 23 and 24 so as to establish a pair of tines or tongues. One or both of these tongues can be bent over as shown in Figure 3 so as to lock the block 22 in place. It will be observed that the wedge 22 only engages against the back end of the opening 21 in the wedge member 7. Consequently the opening 21 may be formed as an open slot as shown by the dotted lines 25 and 26 in Figure 4. In such case there will be also established a notch or recess in the position of the line 26 so that a tool can be set down past the end of the extension 17 and engaged with said slot or recess. Thereupon the said tool can be manipulated so as to loosen-up the wedge member 7 in order to disengage the same from the member 6.

While I have herein shown and described only a single embodiment of the features of my present invention, still I do not intend to limit myself thereto except as I may do so in the claim.

I claim:

A device of the class described comprising in combination a body member having a longitudinally extending through opening to accommodate a pipe section, one side of said through opening being of curved form to directly engage the surface of the pipe section and the opposite side of said through opening being of larger size and leaving a curved longitudinally extending space between said member and the pipe section, said space tapering in thickness lengthwise of the device, a curved wedge member having a concave surface adapted to directly engage the pipe section and having an outwardly facing convex surface adapted to engage the encircling member, said wedge member tapering in thickness lengthwise of the device, there being an outwardly reaching longitudinally extending channel in said member, and an outwardly reaching longitudinally extending rib on the wedge member engaging said channel, there being a pair of oppositely disposed slots in the sides of said channel portion and an opening in said rib registering with said slots, and a wedge block extending through the slots and through said opening and tending to draw the wedge member lengthwise of the pipe section and the encircling member when the wedge block is fixed into place, substantially as described.

LLOYD J. BROWN.